US011917523B2

(12) United States Patent
Pan et al.

(10) Patent No.: US 11,917,523 B2
(45) Date of Patent: Feb. 27, 2024

(54) POLYMORPHIC NETWORK CONTROL SYSTEM AND METHOD SUPPORTING MOBILE ACCESS OF TERMINAL

(71) Applicants: ZHEJIANG LAB, Zhejiang (CN); INFORMATION ENGINEERING UNIVERSITY, Henan (CN)

(72) Inventors: Zhongxia Pan, Hangzhou (CN); Peng Yi, Zhengzhou (CN); Le Tian, Zhengzhou (CN); Tao Zou, Hangzhou (CN); Juan Shen, Zhengzhou (CN)

(73) Assignees: ZHEJIANG LAB, Hangzhou (CN); INFORMATION ENGINEERING UNIVERSITY, Zhengzhou (CN)

(*) Notice: Subject to any disclaimer, the term of this patent is extended or adjusted under 35 U.S.C. 154(b) by 0 days.

(21) Appl. No.: 18/325,139

(22) Filed: May 30, 2023

(65) Prior Publication Data

US 2024/0007929 A1 Jan. 4, 2024

Related U.S. Application Data

(63) Continuation of application No. PCT/CN2022/126622, filed on Oct. 21, 2022.

(30) Foreign Application Priority Data

Jul. 1, 2022 (CN) .......................... 202210765413.3

(51) Int. Cl.
*H04W 40/26* (2009.01)
*H04L 45/7453* (2022.01)
(Continued)

(52) U.S. Cl.
CPC ............ *H04W 40/26* (2013.01); *H04L 45/04* (2013.01); *H04L 45/7453* (2013.01); *H04W 76/25* (2018.02)

(58) Field of Classification Search
None
See application file for complete search history.

(56) References Cited

U.S. PATENT DOCUMENTS 8,467,382 B1 6/2013 Doverspike et al.
2012/0180122 A1 7/2012 Yan et al.
(Continued)

FOREIGN PATENT DOCUMENTS

CN 101459698 A 6/2009
CN 104796344 A 7/2015
(Continued)

OTHER PUBLICATIONS

International Search Report (PCT/CN2022/126622); dated Feb. 22, 2023.
(Continued)

*Primary Examiner* — Hong Shao
(74) *Attorney, Agent, or Firm* — W&G Law Group

(57) ABSTRACT

A polymorphic network control system and a polymorphic network control system method supporting terminal mobile access. A network architecture is redesigned based on the idea of separation of an identifier from a locator. In this network mode, the three-layer protocol is no longer a traditional IP message, but a message carrying a locator and an identifier. The polymorphic SDN network controller is responsible for forwarding the data packet to a destination corresponding to a destination locator. When the network location of a mobile device is changed, the transmission connection established based on the identifier will suspend communication due to the disconnection of the physical link. When the mobile device is re-accessed and a new forwarding path is established, the transmission connection can recover communication.

7 Claims, 2 Drawing Sheets

(51) Int. Cl.
  *H04W 76/25*   (2018.01)
  *H04L 45/02*   (2022.01)

(56) References Cited

U.S. PATENT DOCUMENTS

2013/0315102 A1   11/2013   Kahng et al.
2016/0197831 A1    7/2016   De Foy

FOREIGN PATENT DOCUMENTS

| CN | 107395500 A | 11/2017 |
| CN | 108881131 A | 11/2018 |
| CN | 112565094 A | 3/2021 |
| CN | 113220679 A | 8/2021 |
| CN | 113315704 A | 8/2021 |
| CN | 114189847 A | 3/2022 |
| CN | 114885443 A | 8/2022 |
| WO | 2011022896 A1 | 3/2011 |

OTHER PUBLICATIONS

First Office Action(CN202210765413.3); dated Aug. 19, 2022.
Notice of Allowance(CN202210765413.3); dated Sep. 2, 2022.
Research-on-heterogeneous-identifier-namespace-management-and-control-architecture-in-polymorphic-network-environment.
Research-on-the-full-dimensional-defined-polymorphic-smart-network.
Research-progress-of-smart-collaborative-identifier-networks.
Proactive-and-Power-Efficient-Hybrid-Virtual-Network-Embedding: An-AWS-Cloud-Case-Study.

POLYMORPHIC NETWORK CONTROL SYSTEM AND METHOD SUPPORTING MOBILE ACCESS OF TERMINAL

CROSS-REFERENCE TO RELATED APPLICATIONS

The present application is a continuation of International Application No. PCT/CN2022/126622, filed on Oct. 21, 2022, which claims priority to Chinese Application No. 202210765413.3, filed on Jul. 1, 2022, the contents of both of which are incorporated herein by reference in their entireties.

TECHNICAL FIELD

The present application belongs to the technical field of control technology for a computer polymorphic network, in particular to a polymorphic network control system and a polymorphic network control method supporting terminal mobile access.

BACKGROUND

With the rapid development of Internet technology and communication technology, the communication between mobile devices has gradually replaced the fixed host/server communication model that has dominated since the birth of the Internet. The existing Internet protocols initially served terminal users with fixed locations, and the technical assumption thereof is not consistent with that of the mobile devices. For example, an IP address is designed for a static network address, and the transmission control protocol depends on a fixed path from a terminal to a terminal. This assumption is not applicable to mobile devices, and the support for data transmission of mobile users in mobile contexts is not ideal. At present, the Internet is intended to connect the machines directly to the network to which they are directly connected, which has a strong network concentration. Any change in network membership or connection will require the device to regain the network address and new identity, which will lead to stream-based communication. The number of mobile devices and data traffic increase exponentially, and mobile applications and the resulting service, integrity and management issues drive us to design and develop a brand-new Internet architecture.

SUMMARY

In view of the technical deficiency of reliability and continuity for supporting mobile terminal access by the current IP-based Internet architecture, the purpose of the present application is to provide a polymorphic network control system and a polymorphic network control method for supporting mobile terminal access. The present application is an architecture supporting mobile services and flexible transmission, which meets the requirements for the increasing number of mobile platforms and related applications and provides support for the next generation Internet with more mobile applications.

The present application is realized by the following technical solution: a polymorphic network control system supporting terminal mobile access includes a polymorphic network control plane and a polymorphic network data plane;

the polymorphic network control plane consists of a global identity resolution service, a polymorphic Software-defined Networking (SDN) controller and a global identity authentication service; the global identity resolution service defines a mapping between an identifier service and a network address service by a distributed hash table and is responsible for establishing a connection between an identity name and a device and a network address in a network; the polymorphic SDN network controller updates intra-domain routing and inter-domain routing of a network layer by obtaining a mapping table of the global identity resolution service; the global identity authentication service maps an identifiable identity name to an identifier;

the polymorphic network data plane consists of a link layer, a network layer, a transport layer and an application layer; the application layer is configured to process different application programs and realize identity addressing, file transmission and message delivery services based on the identifier by calling a Socket Application Programming Interface (API); the application layer converts the identifiable identity name into an identifier by the global identity authentication service; the transport layer is responsible for receiving an application layer message and segmenting the application layer message into chunks; one chunk represents one autonomous data unit, and the chunk is routed by the network and contains a header of a destination identifier; the application programs may be selected in several supported transport protocols by options in a messaging interface; the transport layer comprises an identity service and a network address service, the identity service uses the identifier to identify various objects on the network; the network address is a latest group of network addresses that the global identity resolution service dynamically binds to a destination identifier; the network layer comprises intra-domain routing and inter-domain routing mechanisms, and hybrid routing based on identity information and address information is adopted for routing to achieve expandability; the hybrid routing based on identity information and address information refers to mapping the identifier to the network address, and routing by using the network address, which requires a global authentication service; the link layer performs protocol encapsulation on data based on different underlying physical network interfaces and different device drivers in the system.

A polymorphic network control method supporting terminal mobile access, which is implemented based on the above polymorphic network control system supporting terminal mobile access, includes the following steps:

(1) A wireless access point AP releases a channel of a wireless network based on wifi in an Institute of Electrical and Electronics Engineers (IEEE) 802.11 protocol during a process of the mobile device accessing the link layer of the system, then the mobile device also scans, identifies and connects the channel of the wireless network corresponding to the AP based on the IEEE 802.11 protocol, and subsequently the global identity resolution service needs to complete the registration of a mapping relationship between the identifier of the mobile device and the network address and starting a keep-alive mechanism between an access router and the mobile device;

(2) Introduction of the identifier and the network address enables the identifier to be separated from the locator of the device in the network, and separation of the identity and location enables an identifier network to support the hybrid routing of the identity information and the location information; in addition to storing an identifier of a destination host, a data message also stores a network address of the destination host with an optional field; and two kinds of forwarding tables are stored in a routing device of a network layer in a polymorphic network, one being a mapping from the identifier to the network address, the other being a mapping from the network address to a port number or a next hop address;
(3) In the polymorphic network, the chunk is transmitted to a destination node hop by hop in the network layer, and data is selectively stored in each hop temporarily; a simple link layer data transmission protocol realizes reliable transmission of each hop; two complementary group elements are used in each hop, namely, a segmenter of an upstream node and an aggregator of a downstream node; the segmenter segments the data and transmits the data as chunks of a largest transmission unit, and the aggregator aggregates the chunks for routing.

Further, step (1) includes the following sub-steps:
(1.1) The access router maintains information of a network host that has accessed the router, and periodically broadcasts a probing packet for the network host.
(1.2) When accessing a network, the network host receives the network host probing packet broadcast by the access router and replies with a probe return packet.
(1.3) After receiving the replied probe return packet, the access router inquires whether the host has been registered. If the host has not been registered, registered network information that is locally maintained is updated, and a registration package is constructed and the registration package is uploaded to a global identity resolution service, and then step (1.4) is executed; if the host has already been registered, step (1.5) is executed without the need to construct a registration package.
(1.4) The global identity resolution service receives the registration package, newly creates a mapping of the identifier to the network address and completes global identity registration.
(1.5) The access router continues to periodically broadcast the probing packet of the network host and receives the probe return packet; when the network host is disconnected from the access router and the access router fails to receive the probe return packet of the host over time, the router deletes the network host information that is locally maintained and constructs a logout packet to be uploaded to the global identity resolution service.
(1.6) The global identity resolution service receives the logout package and completes logout operation.

Further, in step (2), in certain specific scenarios, a data message may contain a plurality of network addresses, including the following cases:
(2.1) Routing based on a network address: if a destination network address is encapsulated in the data message or a forwarding table has the destination network address, forwarding is carried out directly according to the destination network address.
(2.2) Routing based on an identifier: if the data message is encapsulated with a destination identifier but has no destination network address or transmission based on the network address has an error, routing based on an identifier is executed. and the corresponding network host is found out by querying the identifier; if the mapping relationship between the identifier and the network address is found in any link in a transmission process, the data message is encapsulated into the network address again to be converted into routing based on the network address in a subsequent transmission process.

Further, step (3) includes the following sub-steps:
(3.1) A transmitting terminal segments the data message into several SEGMENT_DATA, and adds a header field hop header of a next hop message.
(3.2) A receiving terminal receives the segmented SEGMENT_DATA+hop header and reassembles a new data message for transmission.

Further, in step (3), handshake signals Chunk Synchronize Sequence Numbers (CSYN) and Chunk Synchronize Sequence Numbers_Acknowledge character (CSYN_ACK) are introduced, and the transmitting terminal will send a CSYN data message before and after data transmission, so as to detect link state and confirm the completeness of reception and transmission; when and only when CSYN_ACK data corresponding to CSYN is received, the transmitting terminal will consider that a current action has been correctly completed.

Further provided is a readable storage medium on which programs are stored. When executed by a processor, the programs implement the above polymorphic network control method supporting terminal mobile access.

The present application has the following the advantages: the present application can better realize mobility support and reliability guarantee in the network, and a brand-new mobile-centric network architecture is designed. When the network location of the mobile device is changed, the transmission connection established based on the identifier will suspend communication due to the disconnection of the physical link. When the mobile device is re-accessed and a new forwarding path is established, the transmission connection can recover communication. Therefore, the problem that the transmission connection will be disconnected and reconnected due to the change of an IP identifier after the terminal device moves in the traditional IP network is avoided.

DESCRIPTION OF EMBODIMENTS

According to the present application, the network architecture is redesigned based on the idea of separation of an identifier from a locator, on the basis of which an identifier polymorphic network supporting the terminal mobile access is constructed in combination with a polymorphic SDN controller architecture. In this network mode, the three-layer protocol is no longer a traditional IP message, but a message carrying a locator and an identifier. The polymorphic SDN network controller is responsible for forwarding the data packet to a destination corresponding to a destination locator.

Figure 1:
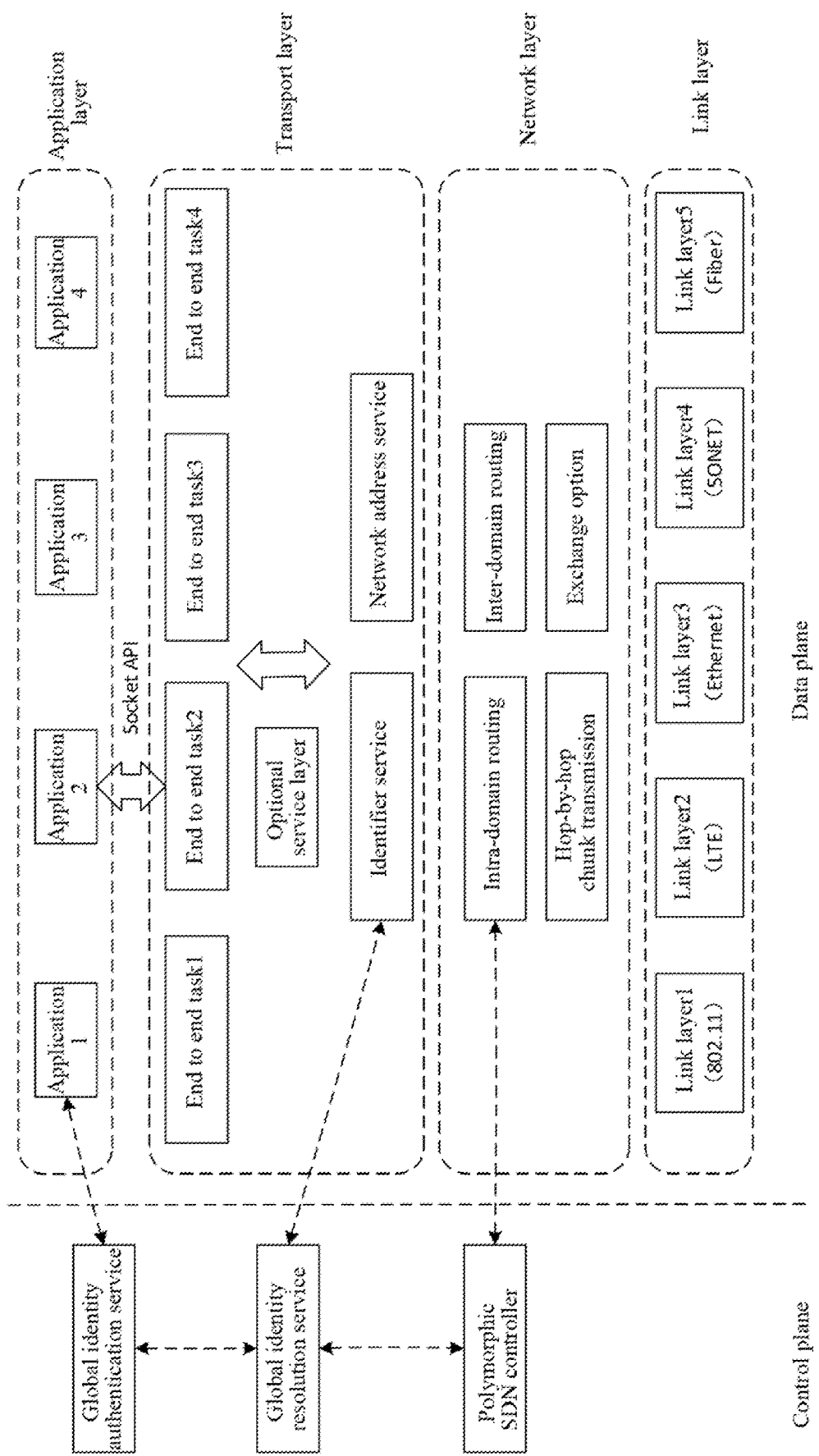
FIG. 1 is a structural block diagram of a polymorphic network control system supporting terminal mobile access according to the present application.

As shown in FIG. 1, a polymorphic network control system supporting terminal mobile access in the present application includes a polymorphic network control plane and a polymorphic network data plane.

The polymorphic network control plane consists of a global identity resolution service, a polymorphic SDN controller and a global identity authentication service.

The global identity resolution service defines a mapping between an identifier service and a network address service by a distributed hash table and is responsible for establishing a connection between an identity name and a device and a network address in a network.

The polymorphic SDN network controller updates intra-domain routing and inter-domain routing of a network layer by obtaining a mapping table of the global identity resolution service.

The global identity authentication service maps an identifiable identity name to a globally unique identifier, i.e., a globally unique identifier (GUID).

The polymorphic network data plane consists of a link layer, a network layer, a transport layer and an application layer.

The application layer is used to process different application programs and realize identity addressing, file transmission and message delivery services based on the identifier by calling a Socket API. The application layer converts the identifiable identity name into an identifier by the global identity authentication service.

The transport layer is responsible for receiving an application layer message and segmenting the application layer message into chunks or protocol data units (PDUs). One chunk represents one autonomous data unit, and the chunk is routed by the network and contains authoritative routing information, i.e., a header of a destination identifier. A chunk can be as big as hundreds of MByte, but the size can also be negotiated with the next hop or even the final receiver of the message to adapt to resource differences. As in the traditional sockets, application programs may be selected in several supported transport protocols by the options in the messaging interface. The transport layer further includes an identity service and a network address service. The identity service uses a flat, non-hierarchical, globally unique identifier (GUID) to identify various objects on the network. The GUID is designed based on a public key and is distributed by a specialized authentication unit to specific network objects, and the GUID will not be changed. The Network Address (NA) is the most recent set of network addresses that the global identity resolution service dynamically binds to a destination GUID.

The network layer comprises intra-domain routing and inter-domain routing mechanisms, and hybrid routing based on identity information and address information is adopted for routing to achieve expandability. The hybrid routing based on identity information and address information refers to mapping the GUID to the NA, and routing by using the NA, which requires a global authentication service.

The link layer performs protocol encapsulation on data based on different underlying physical network interfaces and different device drivers in the system.

The present application relates to a polymorphic network control method supporting terminal mobile access based on the above system, which includes the following steps.

(1) A wireless access point AP releases a channel of a wireless network based on wifi in an IEEE 802.11 protocol during a process of the mobile device accessing the link layer of the system, then the mobile device also scans, identifies and connects the channel of the wireless network corresponding to the AP based on the IEEE 802.11 protocol, and subsequently the global identity resolution service needs to complete the registration of a mapping relationship between the identifier of the mobile device and the network address and starting a keep-alive mechanism between an access router and the mobile device, including the following sub-steps:

(1.1) The access router maintains information of a network host that has accessed the router, and periodically broadcasts a probing packet (LINKPROBE) for the network host.

(1.2) When accessing a network, the network host receives the network host probing packet broadcast by the access router and replies with a probe return packet (LINKPROBE_ACK).

(1.3) After receiving the replied probe return packet, the access router inquires whether the host has been registered; if the host has not been registered, registered network information that is locally maintained is updated, and a registration package (ASSOC) is constructed and the registration package is uploaded to a global identity resolution service, and then step (1.4) is executed; if the host has already been registered, step (1.5) is executed without the need to construct a registration package.

(1.4) The global identity resolution service receives the registration package, newly creates a mapping GUID-NA and completes global identity registration.

(1.5) The access router continues to periodically broadcast the probing packet of the network host and receives the probe return packet; when the network host is disconnected from the access router and the access router fails to receive the probe return packet of the host over time, the router deletes the network host information that is locally maintained and constructs a logout packet (DEASSOC) to be uploaded to the global identity resolution service.

(1.6) The global identity resolution service receives the logout package and completes logout operation.

(2) Introduction of the GUID and the NA enables the identifier to be separated from the locator of the device in the network, and separation of the identity and location enables an identifier network to support the hybrid routing of the identity information and the location information; in addition to storing a GUID of a destination host, a data message also has an optional field to store a network address of the destination host; two kinds of forwarding tables are stored in a routing device of a network layer in a polymorphic network, one being a mapping from the GUID to the network address NA, the other being a mapping from the network address NA to a port number or a next hop address. In some certain specific scenarios, the data message may include a plurality of network addresses, including the following cases:

(2.1) NA-based routing: if a destination NA is encapsulated in the data mmesage or a forwarding table has the destination NA, forwarding is carried out directly according to the destination network address.

(2.2) GUID-based routing: if the data mnessage is encapsulated with a destination GUID but has no destination NA or transmission based on the NA has an error, GUID-based routing will be executed; this way of finding the corresponding network host by querying the GUID is called "slow path"; if the GUID-NA mapping relationship is found in any link in a transmission process, the data message will be encapsulated into the NA again to be converted into routing based on the network address in a subsequent transmission process.

(3) In the polymorphic network, the chunk is transmitted to a destination node hop by hop in the network layer, and data is selectively stored in each hop temporarily; a simple link layer data transmission protocol realizes reliable transmission of each hop. This transmission mode is much better than the end-to-end transmission mode (such as TCP/IP) for the wireless part where the link quality will change and the path of the terminal host that may temporarily lose connection. Two complementary group elements are used in each hop, namely, a segmenter of an upstream node and an aggregator of a downstream node. The segmenter segments the data and transmits the data as chunks of a largest transmission unit, and the aggregator aggregates the chunks for routing.

Figure 2:
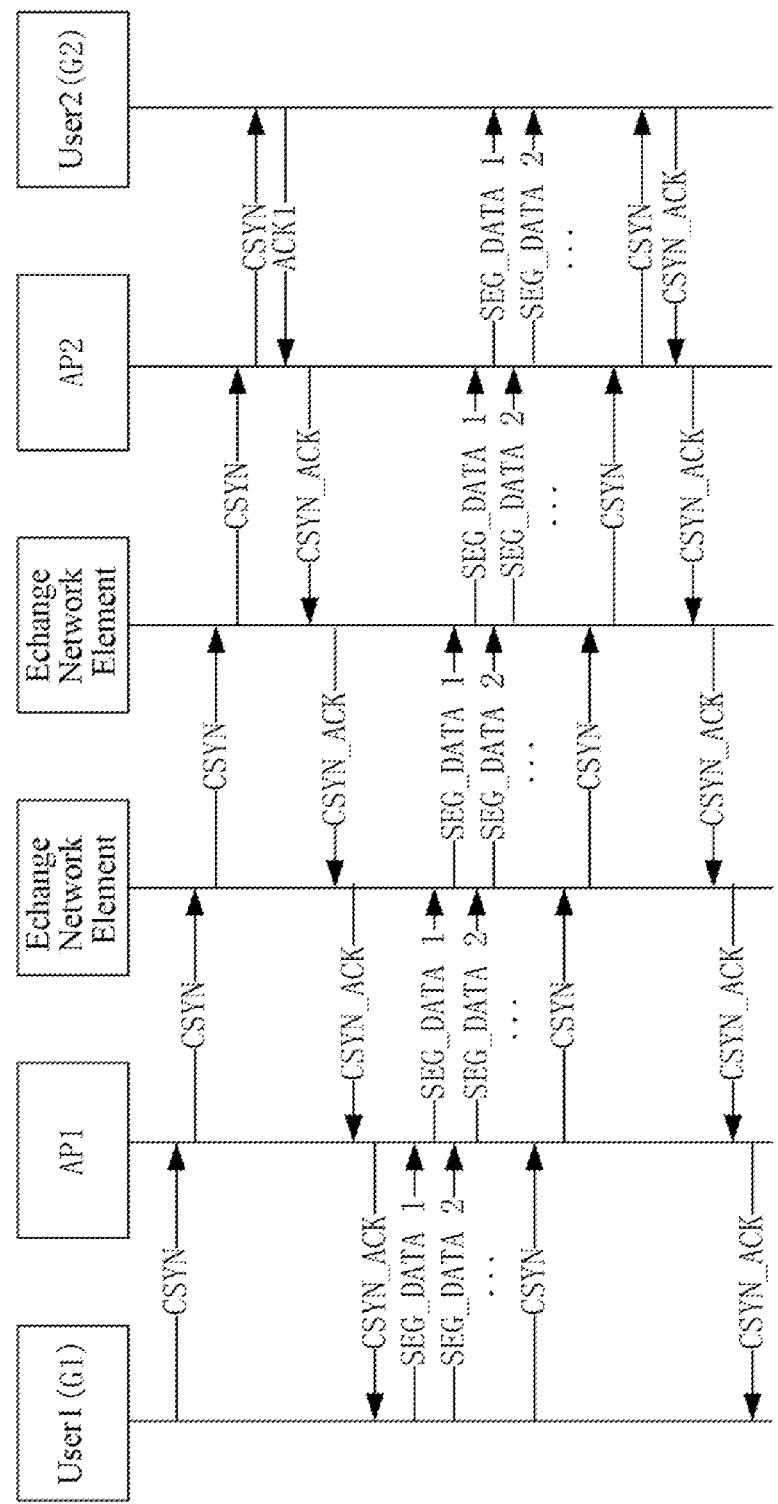
FIG. 2 is a schematic diagram of data plane transmission according to the present application.

As shown in FIG. 2, step (3) includes the following sub-steps:

(3.1) A transmitting terminal (user 1(G1)) segments the data message into several SEGMENT_DATA (including SEG_DATA 1, SEG_DATA 2, . . . ), and adds a header field hop header, hop header, of a next hop message;

(3.2) A receiving terminal receives the segmented SEGMENT_DATA+hop header and reassembles a new data message for transmission.

Here, in order to ensure reliable mobile transmission, handshake signals CSYN and CSYN_ACK are introduced in the polymorphic network, and the transmitting terminal will send a CSYN data message before and after data transmission, so as to detect link state and confirm the completeness of reception and transmission; when and only when CSYN_ACK data corresponding to CSYN is received, the transmitting terminal will consider that a current action has been correctly completed.

An embodiment of the present application also provides a computer-readable storage medium, in which programs is stored. When executed by a processor, the programs implement the polymorphic network control method supporting terminal mobile access in the above embodiment.

The computer-readable storage medium can be an internal storage unit of any device with data processing capability as described in any of the previous embodiments, such as a hard disk or a memory. The computer-readable storage medium can also be any device with data processing capability, such as a plug-in hard disk, a Smart Media Card, SMC), an SD card, a Flash Card and the like. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

Obviously, the above embodiment is only an example for clear explanation, and is not a limitation on the implementation. For those skilled in the art, other modifications or changes in different forms can be made on the basis of the above description. All embodiments need not be nor are they intended to be exhaustive. It is to be understood that various changes and modifications may be made without departing from the spirit and scope of the application as defined by the appended claims.

What is claimed is:

1. A polymorphic network control system supporting terminal mobile access, comprising a polymorphic network control plane and a polymorphic network data plane;

wherein the polymorphic network control plane comprises a global identity resolution service, a polymorphic Software-defined Networking (SDN) controller and a global identity authentication service, wherein the global identity resolution service is configured to define a mapping between an identifier service and a network address service by a distributed hash table and is responsible for establishing a connection, between an identity name and a device, and a network address in a network, wherein the polymorphic SDN network controller is configured to update intra-domain routing and inter-domain routing of a network layer by obtaining a mapping table of the global identity resolution service, and wherein the global identity authentication service is configured to map an identifiable identity name to an identifier; and wherein the polymorphic network data plane comprises a link layer, a network layer, a transport layer and an application layer, wherein the application layer is configured to process different application programs and realize identity addressing, file transmission and message delivery services based on the identifier by calling a Socket Application Programming Interface (API), and to convert the identifiable identity name into an identifier by the global identity authentication service, wherein the transport layer is responsible for receiving an application layer message and segmenting the application layer message into chunks, wherein one chunk represents one autonomous data unit, and the chunk is routed by the network and comprises a header of a destination identifier, wherein the application programs are selected from a plurality of supported transport protocols by options in a messaging interface, wherein the transport layer comprises an identity service and a network address service, wherein the identity service is configured to identify various objects on the network using the identifier, and the network address is a latest group of network addresses that the global identity resolution service dynamically binds to a destination identifier, wherein the network layer comprises intra-domain routing and inter-domain routing mechanisms, and hybrid routing based on identity information and address information is adopted for routing to achieve expandability, wherein the hybrid routing based on identity information and address information refers to mapping the identifier to the network address and routing by using the network address, requiring one global authentication service, and wherein the link layer is configured to protocol-encapsulate data based on different underlying physical network interfaces and different device drivers in the system.

2. A polymorphic network control method supporting terminal mobile access, which is implemented based on the polymorphic network control system supporting terminal mobile access according to claim 1, comprising:

step (1) a wireless access point (AP) releasing a channel of a wireless network based on wifi in an Institute of Electrical and Electronics Engineers (IEEE) 802.11 protocol during a mobile device accessing the link layer of the system, the mobile device scanning, identifying and connecting the channel of the wireless network corresponding to the AP based on the IEEE 802.11 protocol, and the global identity resolution service completes registering a mapping relationship between an identifier of the mobile device and the network address and starting a keep-alive mechanism between an access router and the mobile device;

step (2) introduction of the identifier and the network address enabling the identifier of the mobile device to be separated from a locator of the mobile device in the network, and separating identity and location enabling an identifier network to support the hybrid routing of the identity information and the location information, wherein a data message stores an identifier of a destination host, and a network address of the destination host with an optional field, and wherein a routing device of a network layer in a polymorphic network stores two kinds of forwarding tables, one is a mapping from the identifier to the network address, and the other is a mapping from the network address to a port number or a next hop address; and step (3) in the polymorphic network, the chunk being transmitted to a destination node hop by hop in the network layer, and data being selectively stored in each hop temporarily, wherein each hop is reliably transmitted by a simple link layer data transmission protocol, and adopts two kinds of complementary group elements, a segmenter of an upstream node and an aggregator of a downstream node, and wherein the segmenter segments the data and transmits the data as chunks of a largest transmission unit, and the aggregator aggregates the chunks for routing.

3. The polymorphic network control method supporting terminal mobile access according to claim 2, wherein the step (1) comprises:

sub-step (1.1) the access router maintaining information of a network host that has accessed the router, and periodically broadcasting a probing packet for the network host;

sub-step (1.2) when accessing a network, the network host receiving the network host probing packet broadcast by the access router and replying with a probe return packet;

sub-step (1.3) after receiving the replied probe return packet, the access router inquiring whether the host has been registered, in case the host has not been registered, updating registered network information that is locally maintained, constructing a registration package and uploading the registration package to a global identity resolution service, and executing the step (1.4), in case the host has already been registered, executing the step (1.5) without constructing a registration package;

sub-step (1.4) the global identity resolution service receiving the registration package, creating a mapping of the identifier to the network address and completing global identity registration;

sub-step (1.5) the access router continuing to periodically broadcast the probing packet of the network host and receiving the probe return packet, when the network host is disconnected from the access router and the access router fails to receive the probe return packet of the host over time, the router deleting the network host information that is locally maintained and constructing a logout packet to be uploaded to the global identity resolution service; and sub-step (1.6) the global identity resolution service receiving the logout package and completing a logout operation.

4. The polymorphic network control method supporting terminal mobile access according to claim 2, wherein in the step (2), a data message includes a plurality of network addresses in the following cases:

case (2.1) routing based on a network address: when a destination network address is encapsulated in the data message or the destination network address is in a forwarding table, forwarding is carried out directly according to the destination network address;

case (2.2) routing based on an identifier: when a destination identifier is encapsulated in the data message without the destination network address, or when transmission based on the network address has an error, routing based on an identifier is executed, and a network host corresponding to the identifier is found out by querying the identifier, when the mapping relationship between the identifier and the network address is found in any link in a transmission process, the data massage will be encapsulated into the network address again to be converted into routing based on the network address in a subsequent transmission process.

5. The polymorphic network control method supporting terminal mobile access according to claim 2, wherein the step (3) comprises:

sub-step (3.1) a transmitting terminal segmenting the data message into a plurality of SEGMENT_DATAs, and adding a header field hop header of a next hop data message; and sub-step (3.2) a receiving terminal receiving the segmented SEGMENT_DATA+hop header and reassembling a new data message for transmission.

6. The polymorphic network control method supporting terminal mobile access according to claim 2, wherein in the step (3), handshake signals Chunk Synchronize Sequence Numbers (CSYN) and Chunk Synchronize Sequence Numbers_Acknowledge character (CSYN_ACK) are introduced, and the transmitting terminal sends a CSYN data message before transmitting data and after finishing transmitting data, so as to detect link state and confirm completeness of reception and transmission, and wherein when and only when CSYN_ACK data corresponding to CSYN is received, the transmitting terminal determines that a current action has been correctly completed.

7. A readable storage medium in which programs are stored, wherein when executed by a processor, the programs implement the polymorphic network control method supporting terminal mobile access according to claim 2.

* * * * *